July 15, 1958 J. O. PREISIG 2,843,666

DIRECT CURRENT INSERTION APPARATUS

Filed Sept. 29, 1953 2 Sheets-Sheet 1

INVENTOR.
Joseph O. Preisig
BY [signature]
ATTORNEY

INVENTOR.
Joseph O. Preisig
BY [signature]
ATTORNEY

United States Patent Office 2,843,666

Patented July 15, 1958

2,843,666

DIRECT CURRENT INSERTION APPARATUS

Joseph O. Preisig, Trenton, N. J., assignor to Radio Corporation of America, a corporation of Delaware Application September 29, 1953, Serial No. 383,109

14 Claims. (Cl. 178—7.3)

The present invention relates to new and improved apparatus for use in restoring low frequency and direct current components of a signal and for clamping the conduction-controlling electrode of an electron discharge device at a predetermined level during specified time intervals.

More specifically, although not necessarily exclusively, the invention relates to such apparatus as is particularly well suited for use in connection with circuits for processing a color television signal which, as will be appreciated, requires accurate restoration of its direct current components in order for the monochrome and color inforamtion to be represented accurately. According to certain proposed television standards, and insofar as the monochrome aspect of the composite color television signal is concerned, a scene is imaged onto one or more suitable pickup devices, converted into an electrical signal representative of light values of elemental areas and transmitted to a signal processing device which may include non-conductive coupling means for applying the signal to an image reproducing device. Since the light values are relative to a given background brightness level represented by the D.-C. level of the signal, it is necessary that the composite signal be referred to a given level, in order for the color information which is superimposed thereon to provide accurate and pleasing representation of the scene. Where the signal passes through a non-conductive coupling such as a capacitor, for example, the D.-C. component must be effectively restored, a well-known instance of such action being that which is ordinarily provided at the input electrode of the image reproducing kinescope.

In accordance with existing standards, synchronism of receiver scanning with that which takes place at the transmitter is effected by the transmission of line and field-rate synchronizing signals which are superimposed on blanking pedestals during recurring retrace intervals. These blanking pedestals are ordinarily selected at some arbitrary, predetermined level corresponding to black, for example, which, in turn, may correspond to kinescope cutoff. In view of the necessity for restoring D.-C. components and for properly clamping the conduction-controlling electrode of the image reproducing device in a television receiver, there have been many proposals for accomplishing the stated ends. For example, D.-C. restorers have been proposed which include a biased diode designed to "align" the sync pulse peaks along a given reference line, thereby re-establishing the D.-C. level in a signal which would otherwise be balanced about its A.-C. axis. Since the sync pulses are subject to amplitude variation as a function of signal strength and the like, it is more accurate to provide D.-C. restoration or clamping on the blanking pedestal itself, and this fact is more important in color television apparatus where brightness levels and their relation to color information are essential.

According to the proposed color television standards alluded to supra, synchronism of the color television receiver demodulating circuits with the transmitter "subcarrier" wave is effected by means of "bursts" of subcarrier frequency energy which are transmitted along with the signal and superimposed upon the blanking pedestals. In this manner, the receiver color reference oscillator may be maintained in proper phase and frequency synchronism with the transmitted subcarrier wave in order that the color information (transmitted as phase- and amplitude-modulation of the subcarrier wave) may be effectively detected. A description of the proposed system and the color synchronizing bursts may be found in an article entitled "Color television systems" by George H. Brown and D. G. C. Luck which appeared in the June 1953 issue of the RCA Review.

It is a primary object of the present invention to provide new and improved apparatus of the general type described which insures clamping at the blanking level for color television receivers operating upon a signal having a "burst" or other flag superimposed upon the composite signal's blanking pedestal.

More specifically, it is an important object hereof to provide improved means for D.-C. restoration and clamping in an electron discharge device circuit, which means are effective both for signals which include described bursts and those which do not include the bursts (e. g., a standard monochrome television signal).

In general, the present invention contemplates the provision of normally non-conductive means for connecting a point in the circuit to be clamped and a desired reference level, means for gating the "bursts" and applying them to a circuit resonant at the burst frequency and means for employing the selected bursts for rendering conductive the otherwise non-conductive device, whereby to bring the aforementioned point to its desired reference potential.

It is, therefore, a further object of the present invention to provide novel D.-C. level setting means for use in conjunction with an electron discharge device, which means are rendered operative by a flag which occurs at a fixed point on the recurring reference portions of a composite television signal.

Still another object is the provision of means as set forth, which means are operative even with signals which do not contain such identifying flags.

Additional objects and advantages of the present invention will become apparent to persons skilled in the art from a study of the following detailed description of the accompanying drawing, in which.

Figures 1, 2:
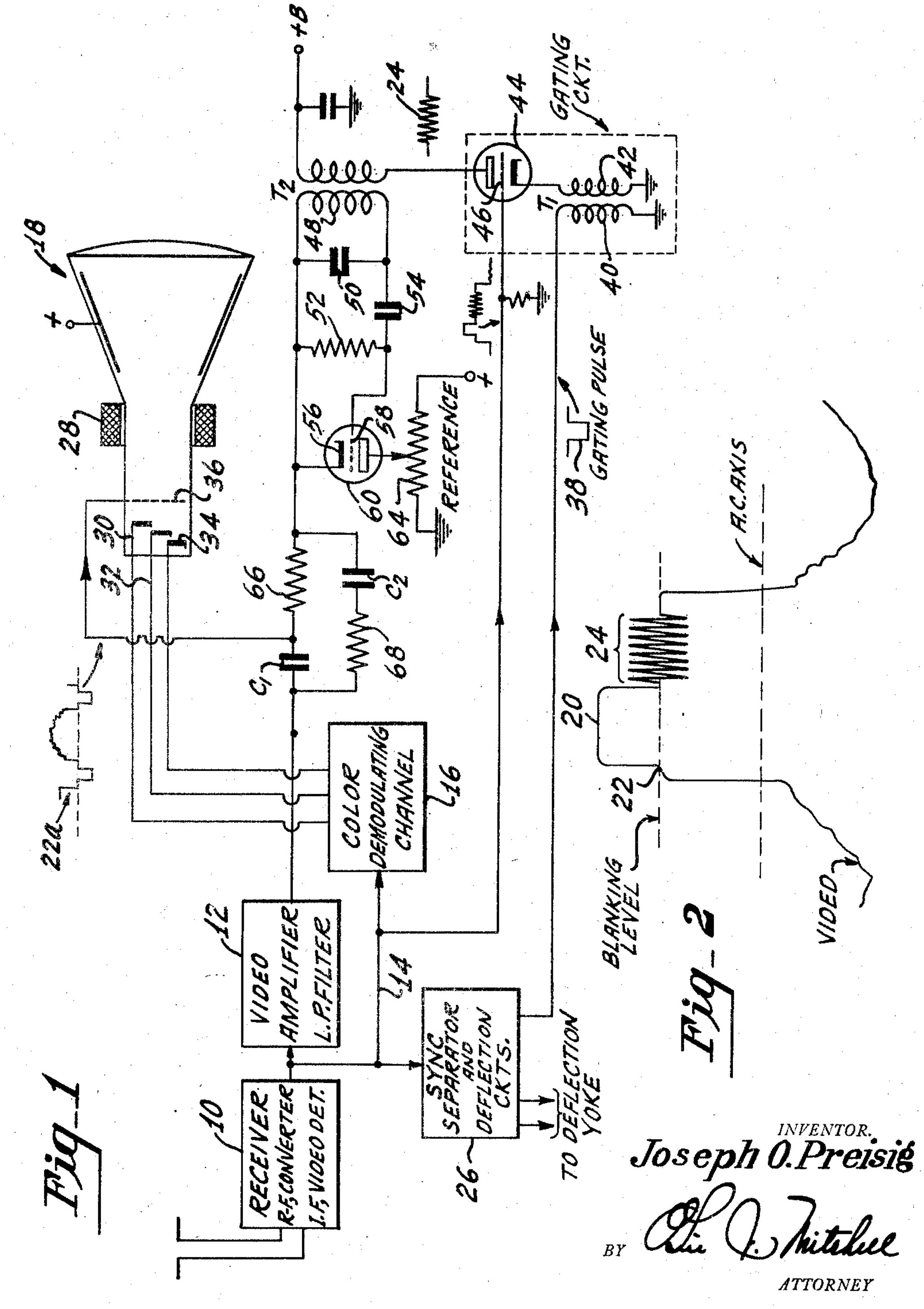
Fig. 1 illustrates by way of a block and schematic diagram, a color television receiver embodying the principles of the present invention.
Fig. 2 is a waveform illustrative of a proposed standard color television signal.

Referring to the drawing and, particularly, to Fig. 1 thereof, there is shown, in generalized form, a proposed type of television receiver including block 10 which is illustrative of the R. F., converter, I. F. and video detector stages of the receiver. The detected composite television signal is applied to video amplifier 12 which includes means for filtering or selecting the brightness components of the signal. The composite signal is also applied from the video detector via lead 14 to a color demodulating channel 16 which may be of any well known form and which has as its purpose that of detecting the color information from the subcarrier wave for application to the color image-reproducing kinescope 18.

The composite received signal, after detection, has the form shown in Fig. 2 and includes synchronizing pulses 20 superimposed on blanking pedestals 22, the "back porch" of each blanking pedestal having superimposed thereon a burst 24 of color subcarrier frequency energy. These synchronizing portions of the signal occur at regular intervals having a repetition rate equal, for example, to the horizontal frequency of the system. The synchronizing pulses 20 are separated and used to to maintain synchronism with the transmitter deflection circuits by means of suitable apparatus indicated by block 26 which serves to drive deflection currents of line- and field-frequency through the deflection yoke 28 which is associated with kinescope 18.

In accordance with the type of receiver shown, the color information, after detection by the demodulating channel 16, is or may be applied as separate waves to the cathodes 30, 32 and 34, respectively, of the kinescope. The monochrome or brightness information, on the other hand, is or may be applied to the control electrode 36 of the kinescope 18.

As thus far described, the apparatus of Fig. 1 is in accordance with well-known principles such as those described in detail in an article entitled "Color television signal receiver demodulators" by D. H. Pritchard and R. N. Rhodes, which appeared in the June 1953 issue of RCA Review. Another description of a well-known form of proposed color television receiver is that described in an article entitled "Principles of NTSC compatible color television" by Hirsch et al. which appeared in the February 1952 issue of Electronics, page 88 et seq. As is well-known to those skilled in the art to which the present invention appertains, it is customary to remove the bursts from the composite signal by means of gating pulses which are or may be derived from the horizontal deflection circuits of the receiver. Since the derivation of such gating pulses does not constitute a part of this invention, it will be understood that any well-known means for accomplishing it may be employed. A gating pulse 38 is illustrated as being derived from the deflection circuits 26 and applied to the primary winding 40 of a transformer $T_1$, the secondary winding 42 thereof being in series with the cathode of a burst gating tube 44 which operates in the following manner: The composite signal from the output of the video detector is applied to the control electrode 46 of triode 44, the triode being normally non-conductive but rendered conductive by means of the gating pulses 38. For reasons which will be come apparent, the gating pulse 38 need not be accurately shaped to include only the burst interval but may encompass the entire blanking interval.

In this manner, the bursts 24 (with the synchronizing pulses) are separated from the balance of the composite signal and are applied via transformer $T_2$ to a tuned circuit comprising the secondary winding 48 of the transformer and a shunt capacitor 50, which tuned circuit is resonant at the subcarrier or burst frequency which may, for example, be equal to 3.58 megacycles. Connected to one terminal of the capacitor 50 is the upper end of a resistor 52 whose other end is coupled via capacitor 54 to the opposite end of capacitor 50. Resistor 52 connects the cathode 56 and control electrode 58 of D.-C. inserter triode 60 whose anode 62 is illustrated as being connected to a suitable point on potentiometer 64 which serves as a reference bias source. The specific coupling of the monochrome or brightness signal from the video amplifier 12 to the kinescope control electrode 36 includes coupling capacitors $C_1$ and $C_2$ and resistors 66 and 68 which form a convential circuit for coupling between the video amplifier and control electrode of a kinescope. As will be recognized, it is the desired function of the D.-C. restorer triode 60 to afford a rapid discharge path for capacitors $C_1$ and $C_2$ during the recurring reference portions of the input signal in order to bring their charge to the desired reference level.

The present invention, as has been stated briefly, provides an effective means for assuring clamping on the blanking level 22 of the composite signal, its theory and operation being as follows: Since the only information present during the blanking portion of the composite signal is the color reference burst, the burst is used to key the D.-C. restorer tube 60 so that it is rendered conductive only during blanking portions of the signal. More specifically, the bursts 24, separated by the gating tube 44, are coupled via the primary of transformer $T_2$ to the tuned circuit including inductance 48 and condenser 50 which resonates at the burst frequency. Application of the bursts to the control electrode 58 of the D.-C. restorer tube causes the tube to draw grid current through resistor 52, thereby establishing a cutoff bias for the tube. Development of such self-bias is accomplished by the first few bursts, so that subsequent bursts "ride" on the bias, thereby rendering tube 60 conductive during successive positive-going half cycles of the bursts. During each such positive half cycle, when tube 60 is conductive, the cathode of the tube is caused to attain substantially the same potential as its anode 62 which is, as shown, connected to the reference potential 64. In this fashion, the successive blanking pedestals 22 of the signal are caused to align themselves with the reference potential from source 64, thereby effectively restoring the lost D.-C. component to the signal which is applied to the control electrode of kinescope 18. This alignment is illustrated by the waveform **22*a*** in Fig. 1.

As thus far described, therefore, it is apparent that the apparatus of Fig. 1 serves as an effective D.-C. reinserting means rendered operative by the burst portions of the composite color television signal to align the blanking pedestals of the signal with a predetermined reference potential. Since the receiver, in accordance with proposed standards, is also adapted to receive black and white broadcast material, as distinguished from color broadcasts, it is desirable that the D.-C. restorer circuit be operative for signals which do not contain the color reference bursts. The apparatus of Fig. 1 meets this requirement in the following manner: When a black and white broadcast signal is received, no bursts are present, so that the resonant circuit comprising inductance 48 and capacitor 50 is not excited. Thus, the D.-C. restorer triode 60 fails to draw grid current, with the result that its cathode 56 and control electrode 58 are effectively maintained at the same potential. This, it will be recognized, permits triode 60 to perform as a diode, since its cathode and control electrode are at the same potential. Viewed in this light, it will be seen that tube 60 constitutes a diode whose anode is connected to the reference potential source 64, so that the D.-C. restorer tube may serve as a conventional circuit which aligns the tips of the sync pulses 20 with a fixed reference level. That is to say, in its operation with a black and white broadcast signal, tube 60 is rendered conductive by the negative-going sync pulses applied to its cathode to permit discharging of capacitors $C_1$ and $C_2$, when necessary to alter their charge.

In view of the foregoing, it should be apparent that the D.-C. restoring action of the apparatus of Fig. 1, when operating upon a color television signal which includes the bursts, affords improved noise immunity for the following reasons: First, the gating action of tube 44 eliminates any possible interference by noise occurring during the picture portions of the signal. Secondly, the selectivity of tuned circuit including inductance 48 and condenser 50 prevents passage of energy having a frequency different from its resonant frequency (i. e., color reference burst frequency).

Figure 3:
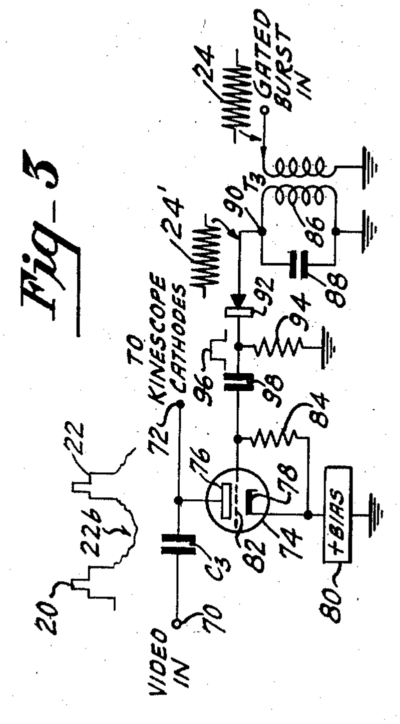
Fig. 3 is an illustration of another form of the invention.

Fig. 3 illustrates another form of the invention and, specifically, an embodiment which renders the D.-C. restorer tube conductive for the entire period of each burst, rather than for only the positive-going half cycles of the bursts. In this figure, and in order to illustrate the flexibility of the invention ,the composite video signal 22b applied to the input terminal 70 has its synchronizing pulses in the positive direction. Coupling capacitor $C_3$, interposed between the input terminal 70 and the kinescope cathodes which are adapted to be connected to terminal 72, must have its charge varied in such manner as to align the blanking pedestals 22 of the signal, in order for the D.-C. component thereof to be restored. The D.-C. restorer circuit of this figure comprises a triode 74 whose anode 76 is connected to terminal 72 and whose cathode 78 is connected to a source of positive reference bias 80. The control electrode 82 of the triode is connected via resistor 84 to cathode 78, in order to afford the grid rectification described with respect to the circuit of Fig. 1. Transformer $T_3$ couples gated bursts 24 to a tuned circuit comprising inductance 86 and shunt capacitor 88 which is resonant at the burst frequency. Thus, when burst frequency energy is applied to the tuned circuit, it resonates at that frequency to provide at terminal 90 a burst 24' which is rectified by diode 92, thus producing at the upper terminal of resistor 94 a positive pulse 96 corresponding to the envelope of the burst. Pulse 96 is coupled via capacitor 98 to the control electrode 82 of the D.-C. restorer tube, causing it to draw grid current and bias itself to cutoff. Succeeding pulses 96 "ride" on the bias thus developed and render triode 74 conductive during their occurrence. This permits clamping of the anode 76 of the D.-C. restorer to the potential of reference bias 80, thereby effecting reinsertion of the lost D.-C. components of the television signal.

Assuming, however that the signal to be operated upon is a black and white signal having no bursts, the cathode 78 and the control electrode 82 of triode 74 are provided with no burst-developed bias, so that the D.-C. restorer tube is, in effect, a diode of conventional form which serves to align the tips of the sync pulses 20 with a fixed reference level. In the case of the apparatus of Fig. 3, which rectifies the bursts prior to their application to the D.-C. restorer tube, it is apparent that an additional advantage is obtained in the matter of noise immunity. This advantage results from the integrating action of the rectifying circuit including resistor 94 which would not be particularly responsive to sharp noise spikes, for example.

Figures 4, 6:
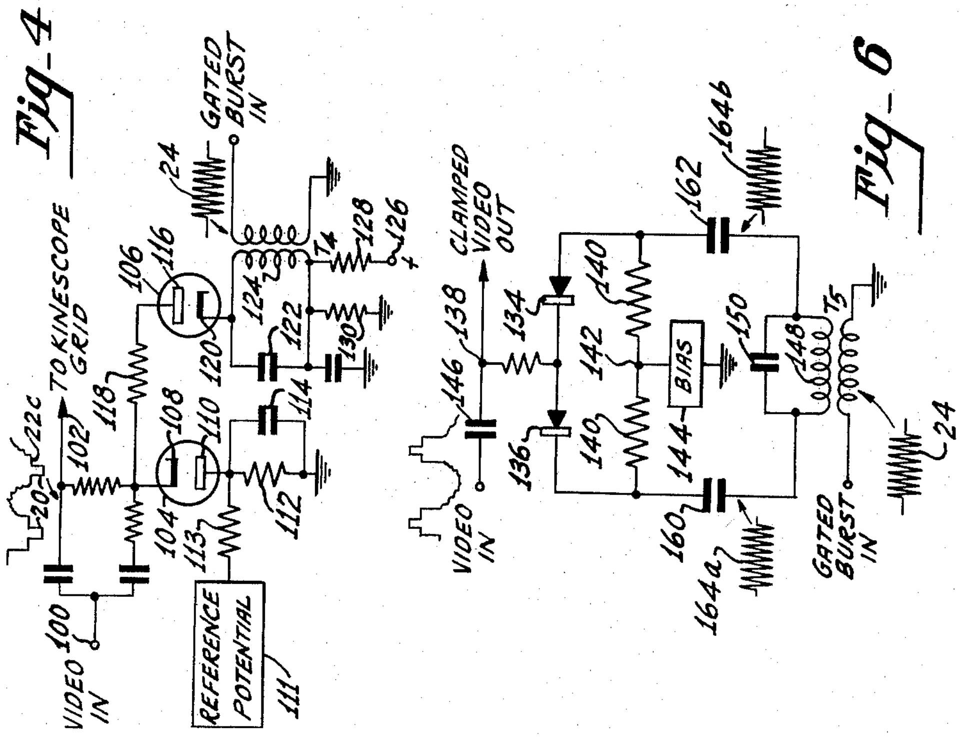
Fig. 4 shows still another form of the invention.
Figs. 5 and 6 illustrate different embodiments of the invention as applied to double keyed clamp circuits.

Still another form of D.-C. restorer which embodies the principles of the present invention is illustrated in Fig. 4 wherein the specific coupling circuit connected between the input 100 and output terminal 102 is illustrated as being substantially identical to that shown in Fig. 1, therefore requiring no additional description. In this embodiment, the only tubes necessary are two diodes 104 and 106 which are connected as follows: The cathode 108 of diode 104 is connected to the point to be brought to a reference potential during recurring blanking intervals, while its anode 110 is connected to a point of fixed reference potential 111 via the resistor 113. Anode 110 is also connected to a point of fixed potential, illustrated as ground, through the self-biasing circuit which includes resistor 112 and shunt capacitor 114. The anode 116 of diode 106 is connected via resistor 118 to cathode 108, while the cathode 120 of diode 106 is connected to a point on the tuned circuit comprising capacitor 122 and the secondary winding 124 of a transformer $T_4$. This point is also connected to a source of positive potential indicated by terminal 126 which serves to bias diode 106 to a normally non-conductive state through the voltage dividing action of resistors 128 and 130. Gated burst 24 applied to the primary winding of transformer $T_4$ render the tuned secondary circuit oscillatory at the burst frequency, so that negative-going half cycles of the burst cause diode 106 to conduct. Conduction of diode 106, in turn, produces conduction of diode 104 during gneative-going half cycles of the bursts, thereby permitting its cathode to be brought to the same potential as its anode, with the resultant restoration of direct current components to the video signal 22c. Assuming, however, that the signal applied to input terminal 100 is of the monochrome variety lacking reference bursts, diode 106 remains non-conductive and permits diode 104 to operate as a conventional D.-C. restorer which aligns the tips of the sync pulses 20.

In the operation of the apparatus of Fig. 4 upon color signals, biasing of the restorer diode 104 depends to a certain extent upon the direct current flowing through it from source 126, and upon the self-bias developed by both sync pulses and bursts. The influence of the sync pulse amplitude upon diode 104 is less, however, than the case of an ordinary D.-C. restorer diode. This fact is true because of the operation of diode 104 which, while rendered conductive by sync pulses, is also rendered conductive during blanking intervals by the negative-going half cycles of the bursts, so that the bias level for the diode is effectively determined by its burst-produced conduction, rather than on its sync-produced conduction. An advantage of the apparatus of Fig. 4 is the fact that it requires the use of only two diodes which are appreciably less expensive than the triodes of Figs. 1 and 3.

Figure 5:
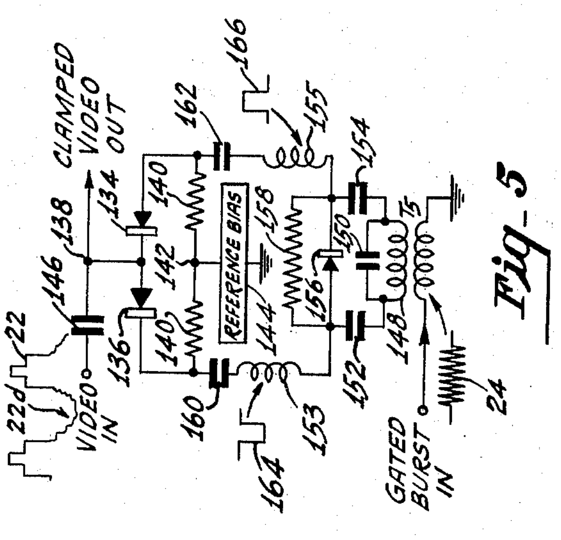

Another form of direct current inserting circuit which is well known in the art is the type described and claimed in U. S. Patent No. 2,299,945, granted October 27, 1942, to K. R. Wendt. In the Wendt patent, there is disclosed a double keyed clamp circuit which includes, as shown in Fig. 5 herein, a pair of serially connected diodes 134 and 136 whose opposite electrodes are connected to a point in the circuit to be clamped indicated as terminal 138. A path connecting the other electrodes of the diodes includes a resistor 140 whose A.-C. midpoint 142 is at an actual potential set by a fixed bias source 144. The diodes are normally non-conducting but are rendered conductive at predetermined times and for intervals which encompass the recurring blanking portions of the composite input signal 22d. In this fashion, a capacitor 146 is permitted to gain or lose charge depending upon the requirements of the signal in order to set the fixed level. In the Wendt circuitry, it is necessary to key the diodes "on" for an interval which coincides with the blanking portion of the signal and, while the phase splitter disclosed in the patent for applying oppositely phased keying pulses is effective, the present invention affords a simplified, yet certain, means for keying on the diodes in a color television receiver. As shown in Fig. 5, the keying means of the present invention includes means such as a transformer $T_5$ for coupling gated bursts 24 to the tuned circuit comprising inductance 148 and capacitor 150 which is resonant at the burst frequency. Coupled across the tuned circuit via capacitors 152 and 154 is a diode rectifier 156 having a load resistor 158. Rectifier 156 is coupled by means of capacitors 160 and 162 to the opposite ends of diodes 136 and 134, respectively.

In the operation of the apparatus of Fig. 5, each incoming burst renders tuned circuit 148, 150 oscillatory at the burst frequency and the bursts are rectified by diode 156, whereby to produce at opposite ends of the load resistor 158 oppositely polarized pulses 164 and 166, respectively, which constitute opposite phases of the detected burst envelope. Pulse 164 is applied to the cathode of diode 136 to render it conductive for its duration, while positive-going pulse 166 effects the same action upon diode 134. Chokes 153 and 155 in series with the leads from the rectifier to the clamp circuit diodes represent impedances for blocking the passage of burst frequency energy while permitting the pulses 164 and 166 to reach the clamp circuit. Thus, it is seen that both of the diodes 134 and 136 are rendered conductive simultaneously and for a time coinciding with the burst interval, thereby permitting point 138 to be clamped to the potential of reference bias source 144 during such interval. Since this interval coincides with the blanking pedestal 22 of the composite signal 22*d*, the signal is clamped at its proper level. Stated otherwise, the apparatus of Fig. 5 employs the color reference bursts as "flags" for keying the clamping diodes at the desired times and for the desired intervals. As a result, the keyed clamp circuit of Fig. 5 affords improved noise immunity by reason of the gating action by which the bursts are applied to the transformer, through the selectivity of the tuned circuit, and by the integration of the burst which is afforded by the rectifier and its associated load circuit.

Another form of the invention as applied to a double keyed clamp circuit of the Wendt variety is shown in Fig. 6 wherein those elements identical to corresponding elements of the circuit of Fig. 5 are designated by the same reference numerals. The circuit of Fig. 6 is, however, simpler than that of the preceding figure in that no rectifier for the bursts is included. Hence, in the operation of the circuit of Fig. 6, each burst 24 applied to transformer $T_5$ renders tuned circuit 148, 150 oscillatory at burst frequency to provide at opposite terminals of the tuned circuit opposite polarities of the burst as shown by the waveforms 164*a* and 164*b*. Each negative-going half cycle of waveform 164*a* renders diode 136 conductive and, simultaneously therewith, each positive half cycle of waveform 164*b* renders diode 134 conductive. In this respect, the action of the circuit of Fig. 6 resembles somewhat the action of the circuit of Fig. 1, namely, in that the clamping action is afforded during alternate half cycles of the bursts, rather than for an extended period corresponding to burst duration as in Figs. 3, 4 and 5. Since each burst comprises at least eight cycles according to proposed standards, adequate clamping action is afforded.

Various changes in the circuitry of the various embodiments shown herein will suggest themselves to persons skilled in the art such, for example, as the use of full-wave rectifiers rather than half-wave rectifiers. Another change which is readily apparent is the reversing of anode and cathode connections for reversed signal polarity, while a still further modification which is easily effected, is the use of self-biasing as opposed to fixed bias for the D.-C. restoring circuits.

Having thus described my invention, what I claim as new and desire to secure by Letters Patent is:

1. In a signal-processing apparatus adapted to operate upon a composite signal which includes regularly recurring reference portions to be clamped to the same level, each of such portions having superimposed thereon an identifying waveform in the form of a burst of sinusoidally varying electrical energy of predetermined frequency, direct current restoring means for maintaining said reference portions at a fixed level, comprising: a utilization circuit for such signal, having an input terminal; capacitive coupling means for applying such signals to said terminal, a source of reference potential; a unilaterally conducting device having at least an electron-emitting electrode and an electron-collecting electrode, one of said named electrodes being connected to such source of potential; means defining a connection between the other of said named electrodes and said terminal in said apparatus to which such signal is applied; means for separating such bursts from such composite signal; and means for coupling said last-named means to an electrode of said unilaterally conductive device for controlling the conduction of said device in such manner as to connect said terminal to such reference potential during the occurrence of such bursts.

2. In a signal-processing apparatus adapted to operate upon a composite signal which includes regularly recurring reference portions to be clamped to the same level, each of such portions having superimposed thereon an identifying waveform in the form of a burst of sinusoidally varying electrical energy of predetermined frequency, direct current restoring means for maintaining said reference portions at a fixed level, comprising: a utilization circuit for such signal, having an input terminal; capacitive coupling means for applying such signals to said terminal, a source of reference potential; a unilaterally conducting device having at least an electron-emitting electrode and an electron-collecting electrode, one of said named electrodes being connected to such source of potential; means defining a connection between the other of said named electrodes and said terminal in said apparatus to which such signal is applied; means responsive to said predetermined frequency for separating such bursts from such composite signals; and means coupling said last-named means to an electrode of said unilaterally conductive device for controlling the conduction of said device in such manner as to connect said terminal to such reference potential during the occurrence of such bursts.

3. The invention as defined by claim 2 wherein said means responsive to said predetermined frequency comprises a tuned circuit whose resonant frequency is equal to said predetermined frequency.

4. The invention as defined in claim 2 wherein said unilaterally conductive device is normally non-conductive and wherein said last-recited means renders said device conductive during the occurrence of each such burst.

5. The invention as defined by claim 2 wherein said last-recited means includes means for detecting the envelope of each of such separated bursts.

6. The invention as defined by claim 2 wherein said unilaterally conductive device further includes a conduction-controlling electrode; means defining a direct current connection between said conduction-controlling electrode and said electron-emitting electrode; said means for coupling said burst-separating means to said unilaterally conductive device being coupled between said conduction-controlling electrode and said electron-emitting electrode.

7. The invention as defined by claim 2 wherein said unilaterally conductive device comprises a diode and wherein said last-named means comprises rectifier means.

8. In a signal-processing apparatus adapted to operate upon a composite signal which includes regularly recurring reference portions to be clamped to the same level, each of such portions having superimposed thereon an identifying waveform in the form of a burst of sinusoidally varying electrical energy of predetermined frequency, said apparatus including a capacitor for coupling such signal to an output terminal, direct current restoring means for clamping said recurring reference portions to a fixed level, which comprises: a pair of unilaterally-conductive devices; means connecting said device to a point of reference potential; means connecting said devices to said terminal, in such manner that, when conductive, one of said devices provides a low impedance discharge path for said capacitor and the other of said devices provides a low impedance charging path for said capacitor, said devices being normally non-conductive; means for separating such bursts from such composite signal; and means coupled to said last-named means and to each of said devices for applying, during the occurrence of a burst, a keying signal to each of said devices of such polarity as to render said devices conductive simultaneously, whereby to cause the charge on said condenser to attain a potential having a fixed relationship to said reference potential.

9. The invention as defined by claim 8 wherein said burst-separating means comprises a tuned circuit resonant at said predetermined frequency.

10. The invention as defined by claim 8 wherein said burst-separating means comprises a tuned circuit resonant at said predetermined frequency; and means for rectifying the output of said tuned circuit.

11. In a signal-processing apparatus adapted to operate upon either of two types of composite signal, one type of signal including regularly recurring reference portions, each of which has superimposed thereon a synchronizing pulse and a burst of sinusoidally varying electrical energy of predetermined frequency and the other type of signal also including such regularly recurring reference portions and synchronizing pulses but lacking such bursts, said apparatus including a capacitor for coupling one of such types of signal to an output terminal, direct current restoring means for clamping such reference portions to a fixed level, which comprises: a source of reference potential; a unilaterally conductive device having an electron-emitting electrode and an electron-collecting electrode, one of said electrodes being connected to such potential source and the other of said electrodes being connected to said terminal; means responsive to said predetermined frequency for separating such bursts from said first-named type of signal; and means for coupling said burst-separating means to said unilaterally conductive device in such manner as to render said device conductive during the occurrence of each of such bursts, whereby to permit said capacitor to alter its charge and clamp such reference portions of a signal to a potential determined by said reference potential; and means for rendering said unilaterally conductive device conductive during the occurrence of such synchronizing pulses when said apparatus is operating upon such second-named type of signal.

12. The invention as defined by claim 11 wherein said means responsive to said predetermined frequency comprises a tuned circuit resonant at such frequency.

13. The invention as defined by claim 11 wherein said unilaterally conductive device further includes a conduction-controlling electrode; said means for coupling said burst-separating means to said device being coupled between said last-named electrode and said electron-emitting electrode; and wherein said last-recited means comprises a direct current connection between said electron-emitting electrode and said conduction-controlling electrode.

14. The invention as defined by claim 11 wherein said means for coupling said burst-separating means to said unilaterally conductive device includes means for rectifying such separated bursts.

References Cited in the file of this patent

UNITED STATES PATENTS

| | | |
|---|---|---|
| 2,431,577 | Moore | Nov. 25, 1947 |
| 2,744,155 | Kihn | May 1, 1956 |